US009765630B2

(12) United States Patent
Herzlinger et al.

(10) Patent No.: US 9,765,630 B2
(45) Date of Patent: Sep. 19, 2017

(54) INTERIOR COOLING CIRCUITS IN TURBINE BLADES

(71) Applicant: General Electric Company, Schenectady, NY (US)

(72) Inventors: Jason Douglas Herzlinger, Schenectady, NY (US); Bradley Taylor Boyer, Greenville, SC (US); Harish Bommanakatte, Bangalore (IN); Anthony Louis Giglio, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1428 days.

(21) Appl. No.: 13/737,023

(22) Filed: Jan. 9, 2013

(65) Prior Publication Data

US 2014/0271225 A1    Sep. 18, 2014

(51) Int. Cl.
*B22C 9/10*    (2006.01)
*F01D 5/18*    (2006.01)

(52) U.S. Cl.
CPC ............... *F01D 5/187* (2013.01); *B22C 9/10* (2013.01); *F05D 2230/21* (2013.01); *F05D 2250/232* (2013.01); *Y02T 50/676* (2013.01); *Y10T 29/49341* (2015.01)

(58) Field of Classification Search
CPC .......... B22D 29/001; B22C 9/10; B22C 9/108
USPC .............. 164/369, 137; 29/889.721, 889.722
See application file for complete search history.

(56) References Cited

U.S. PATENT DOCUMENTS

| 6,966,756 B2 | 11/2005 | McGrath et al. |
| 7,780,414 B1 | 8/2010 | Liang |
| 2008/0145234 A1 | 6/2008 | Lee et al. |
| 2013/0139990 A1* | 6/2013 | Appleby et al. .......... B22C 9/22 164/47 |

* cited by examiner

*Primary Examiner* — Kevin P Kerns
(74) *Attorney, Agent, or Firm* — Mark E. Henderson; Ernest G. Cusick; Frank A. Landgraff

(57) ABSTRACT

A rotor blade including an airfoil portion and a root portion, and an internal cooling circuit having flow passages in the root portion and the airfoil portion, wherein the internal cooling circuit includes: a first flow passage; and a non-integral plug. The plug may include a plug channel configured to correspond to a desired level of coolant flow through the first cooling passage. The plug may be connected to the rotor blade in a fixed blocking position relative to the first flow passage.

16 Claims, 10 Drawing Sheets

INTERIOR COOLING CIRCUITS IN TURBINE BLADES

BACKGROUND OF THE INVENTION

This invention relates to methods of manufacturing blades of combustion turbine engines and, specifically, to the use of a particular internal core arrangement in the casting of turbine blades, and to a blades having internal cooling configurations formed in this manner.

Conventional combustion turbine engines include a compressor, a combustor, and a turbine. As is well known in the art, air compressed in the compressor is mixed with fuel which is burned in the combustor and expanded in the turbine, thereby rotating the turbine and driving the compressor. The turbine components are subjected to a hostile environment characterized by the extremely high temperatures and pressures of the hot products of combustion that enter the turbine. In order to withstand repetitive thermal cycling in such a hot environment, structural integrity and cooling of the turbine airfoils must be optimized.

As one of ordinary skill in the art will appreciate, serpentine or winding cooling circuits have proven to be an efficient and cost effective means of air cooling the shank and airfoil portions of rotor and stator blades in a combustion turbine engines, and such cooling schemes have become very sophisticated in modern engines. The airfoils typically include intricate internal cooling passages that extend radially within the very thin airfoil. The radial passages are frequently connected by a plurality of small passages to allow the flow of cooling air between the larger flow passages. Fabrication of airfoils with such small internal features necessitates a complicated multi-step casting process.

A problem with the current manufacturing process is the fabrication and maintenance of the cores used in the casting and the low yield rates achieved by conventional processes. The main reason for the low yields is that during the manufacturing process of airfoils, a ceramic core that defines the cooling passages of the airfoil often either breaks or fractures. There are a number of factors that contribute to such a high percentage of ceramic cores becoming damaged. First, ceramic, in general, is a brittle material. Second, the airfoils are very thin and subsequently, the cores are very thin. Finally, the small crossover passages and other intricacies in the airfoil result in narrow delicate features that are easily broken under load.

Another drawback is that the fragile nature of the ceramic cores results in production constraints that limit more optimal cooling schemes. In many instances it may be more advantageous for the airfoil cooling and engine efficiency to have smaller crossover holes or more intricate geometric features. However, more intricate cooling passages are sometimes not practical, since the current manufacturing process already yields an insufficiently small number of usable airfoils and has a high percentage of ceramic cores being damaged. More intricate cooling schemes would result in even lower manufacturing yields and even higher, cost per airfoil. Thus, there is a great need to improve manufacturability of the gas turbine engine airfoils to reduce the cost of each airfoil as well as to improve cooling schemes that accomplish this.

BRIEF DESCRIPTION OF THE INVENTION

The present application thus describes a rotor blade comprising an airfoil portion and a root portion, and an internal cooling circuit having flow passages in the root portion and the airfoil portion, wherein the internal cooling circuit includes: a first flow passage; and a non-integral plug. The plug may include a plug channel configured to correspond to a desired level of coolant flow through the first cooling passage. The plug may be connected to the rotor blade in a fixed blocking position relative to the first flow passage.

The present invention further describes a method of manufacturing a blade having an internal cooling circuit, the blade configured for use in an combustion turbine engine, wherein the turbine blade comprising an airfoil portion and a root portion, the method comprising the steps of: casting the internal cooling circuit using a core that includes an oversized supporting connection configured for enhanced core robustness, wherein the oversized supporting connection forms a first flow passage in the internal cooling circuit and is oversized relative to a desired level of coolant flow through the first flow passage during operation; forming a plug; forming a plug channel through the plug, the plug channel configured to correspond to the desired level of coolant flow through the first flow passage; and connecting the plug to the blade so that the plug is fixed in a blocking position relative to the first flow passage.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
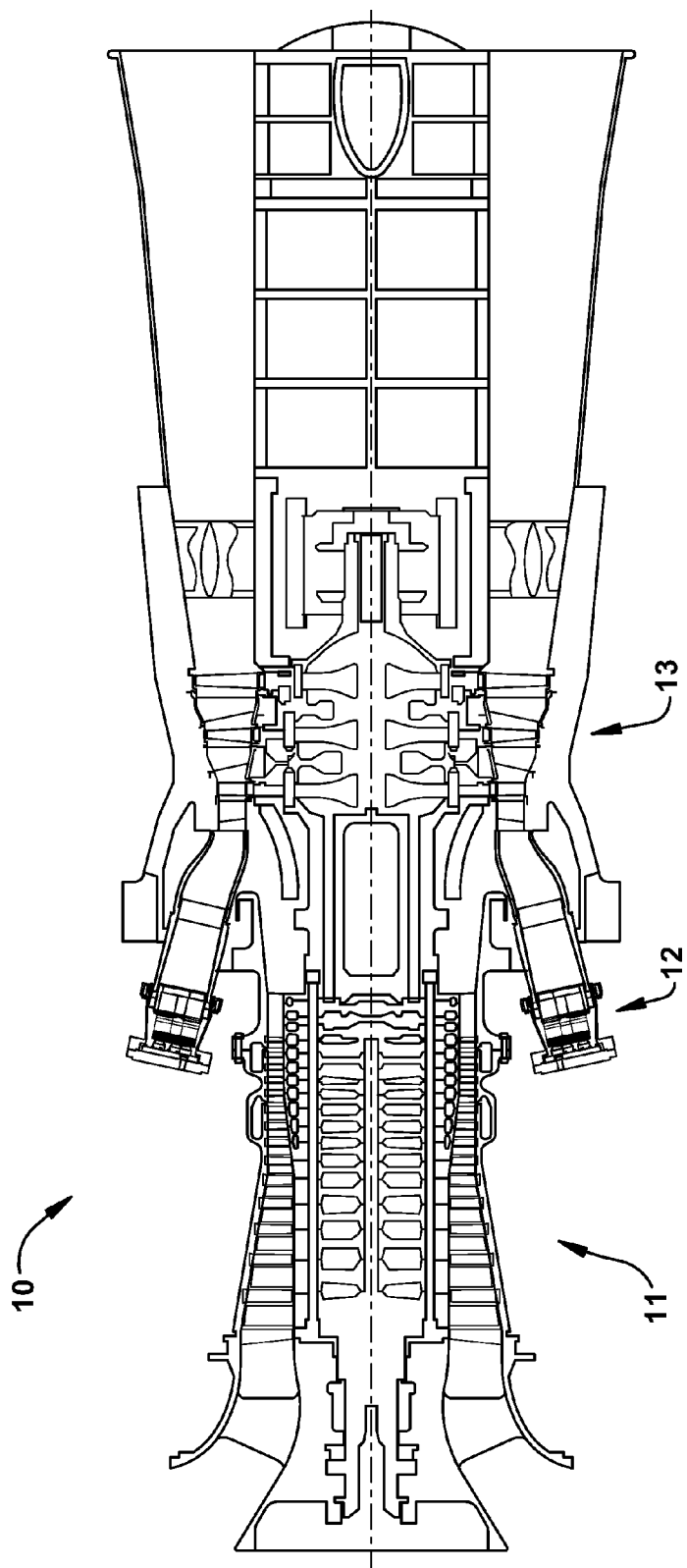
FIG. 1 is a schematic representation of an exemplary turbine engine in which certain embodiments of the present application may be used.

As an initial matter, in order to clearly delineate the invention of the current application, it may be necessary to select terminology that refers to and describes certain parts or machine components within a combustion turbine engine. As mentioned, while the examples provided herein are primarily aimed at combustion turbine engines, those of ordinary skill in the art will appreciate that the present invention is applicable to the rotor blades used in combustion or steam turbine engines. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as being single part may include and be referenced in another context as consisting of multiple components, or, what may be described herein as including multiple components may be referred to elsewhere as a single part. As such, in understanding the scope of the present invention, attention should not only be paid to the terminology and description provided herein, but also to the structure, configuration, function, and/or usage of the component, particularly as provided in the appended claims.

In addition, several descriptive terms may be used regularly herein, and it should prove helpful to define these terms at the onset of this section. Accordingly, these terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. As such, the term "downstream" corresponds to the direction of flow of the fluid, and the term "upstream" refers to the direction opposite to the flow. The terms "forward" and "aft", without any further specificity, refer to directions, with "forward" referring to the forward or compressor end of the engine, and "aft" referring to the aft or turbine end of the engine. The term "radial" refers to movement or position perpendicular to an axis. It is often required to describe parts that are at differing radial positions with regard to a center axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Figure 2:
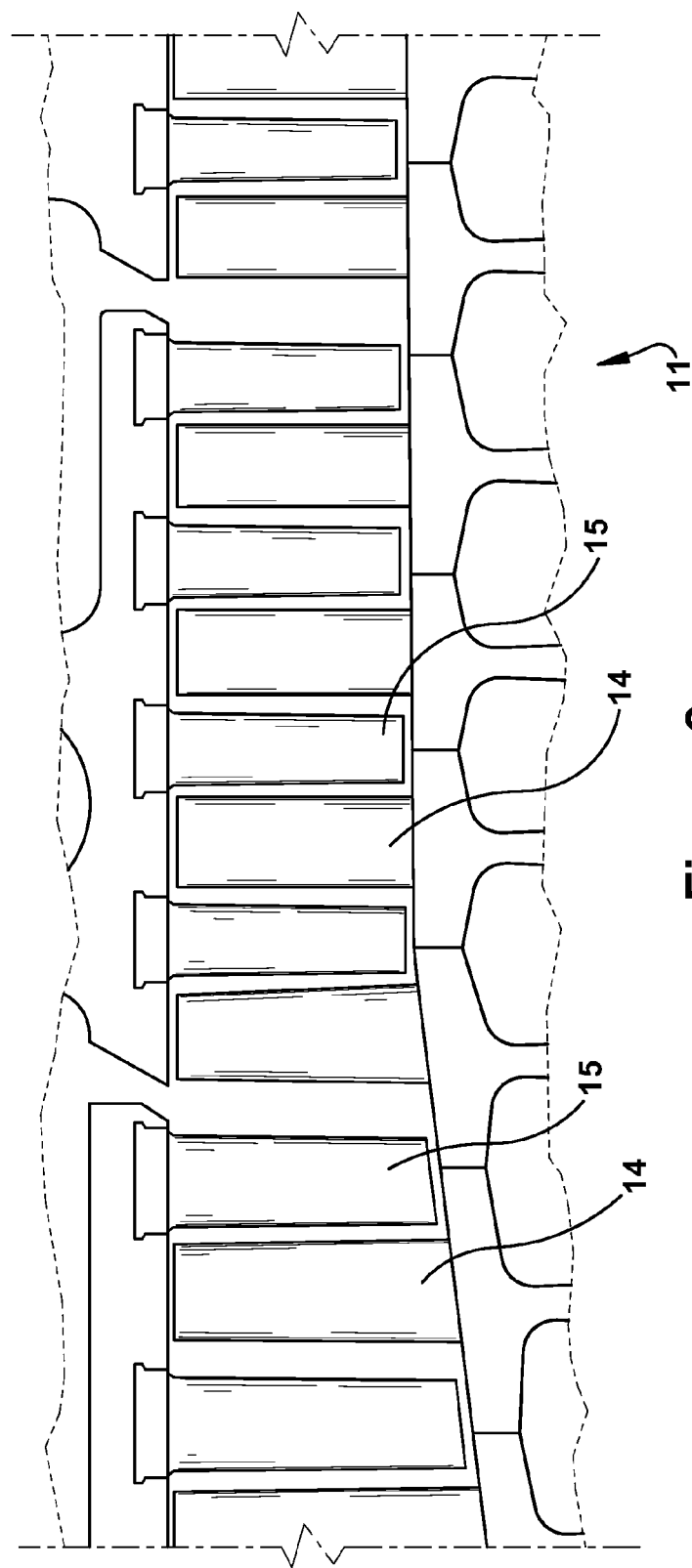
FIG. 2 is a sectional view of the compressor section of the combustion turbine engine of FIG. 1.
Figure 3:
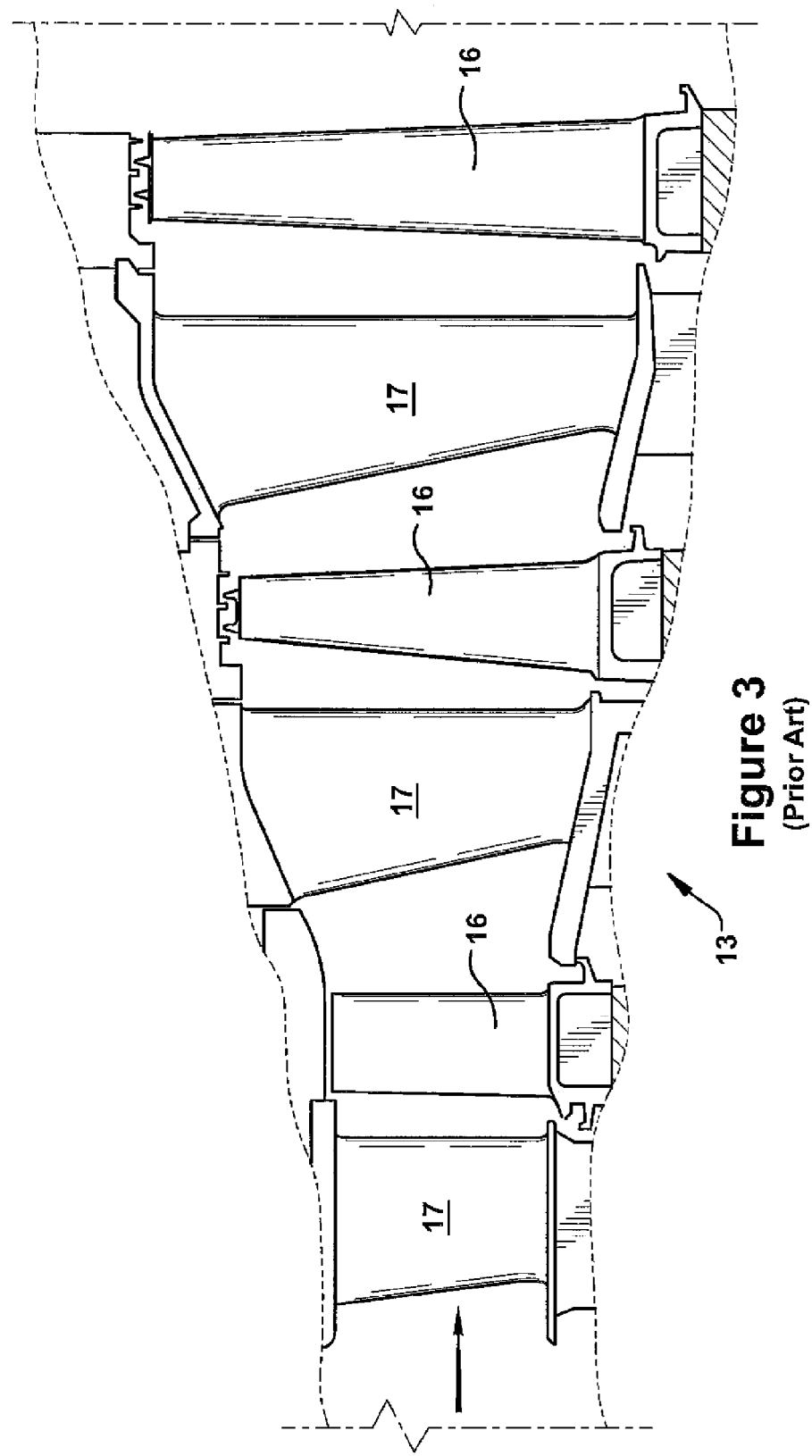
FIG. 3 is a sectional view of the turbine section of the combustion turbine engine of FIG. 1.

By way of background, referring now to the figures, FIGS. 1 through 3 illustrate an exemplary combustion turbine engine in which embodiments of the present application may be used. It will be understood by those skilled in the art that the present invention is not limited to this type of usage. As stated, the present invention may be used in combustion turbine engines, such as the engines used in power generation and airplanes, steam turbine engines, and other types of rotary engines. The examples provided are not meant to be limiting to the type of the turbine engine.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between the compressor 11 and the turbine 13.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an exemplary turbine section or turbine 13 that may be used in the combustion turbine engine of FIG. 1. The turbine 13 may include a plurality of stages. Three exemplary stages are illustrated, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 13. The direction of flow of the hot gases through the hot gas path is indicated by the arrow. As one of ordinary skill in the art will appreciate, the turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 12, energy may be released when the compressed air is mixed with a fuel and ignited. The resulting flow of hot gases from the combustor 12, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
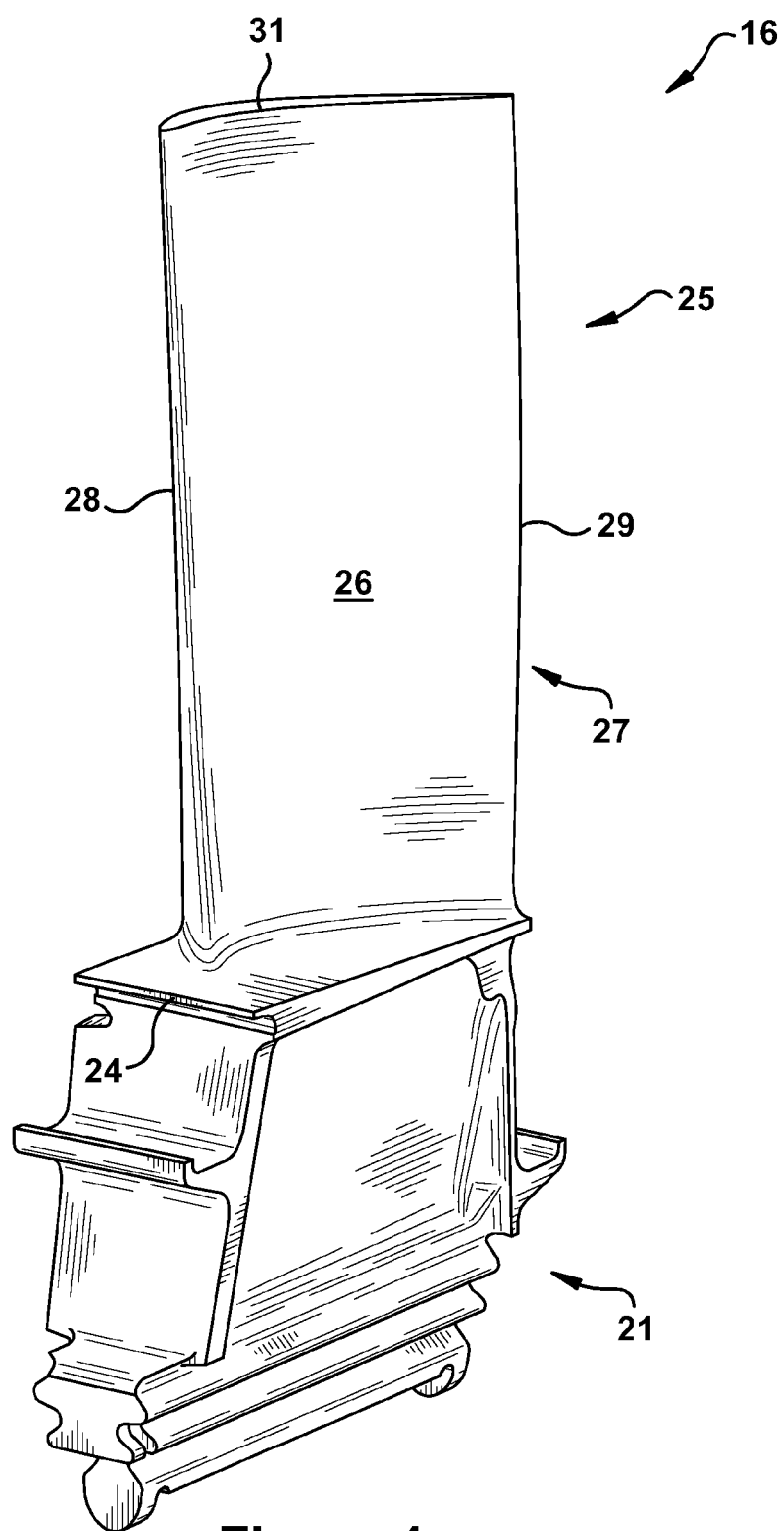
FIG. 4 is a perspective view of a turbine rotor blade of the type in which embodiments of the present invention may be employed.

FIG. 4 is a perspective view of a turbine rotor blade 16 of the type in which embodiments of the present invention may be employed. The turbine rotor blade 16 includes a root 21 by which the rotor blade 16 attaches to a rotor disc. The root 21 may include a dovetail configured for mounting in a corresponding dovetail slot in the perimeter of the rotor disc. The root 21 may further include a shank that extends between the dovetail and a platform 24, which is disposed at the junction of the airfoil 25 and the root 21 and defines a portion of the inboard boundary of the flow path through the turbine 13. It will be appreciated that the airfoil 25 is the active component of the rotor blade 16 that intercepts the flow of working fluid and induces the rotor disc to rotate. While the blade of this example is a turbine rotor blade 16, it will be appreciated that the present invention also may be applied to other types of blades within the turbine engine 10, including turbine stator blades 17. It will be seen that the airfoil 25 of the rotor blade 16 includes a concave pressure sidewall 26 and a circumferentially or laterally opposite convex suction sidewall 27 extending axially between opposite leading and trailing edges 28, 29 respectively. The sidewalls 26 and 27 also extend in the radial direction from the platform 24 to an outboard tip 31.

Figure 5:
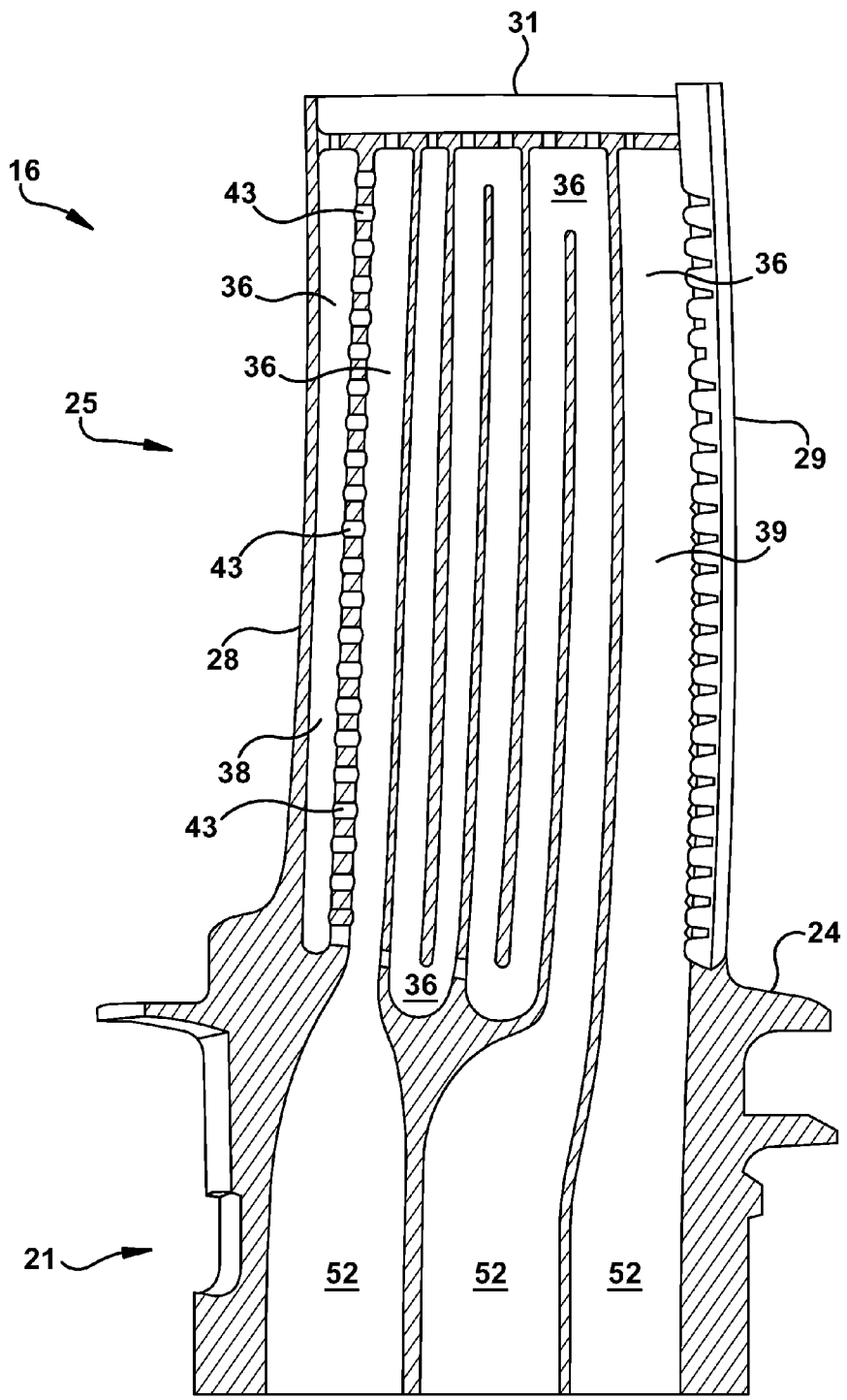
FIG. 5 is a sectional side view of a turbine rotor blade having interior cooling channels of a conventional design.
Figure 6:
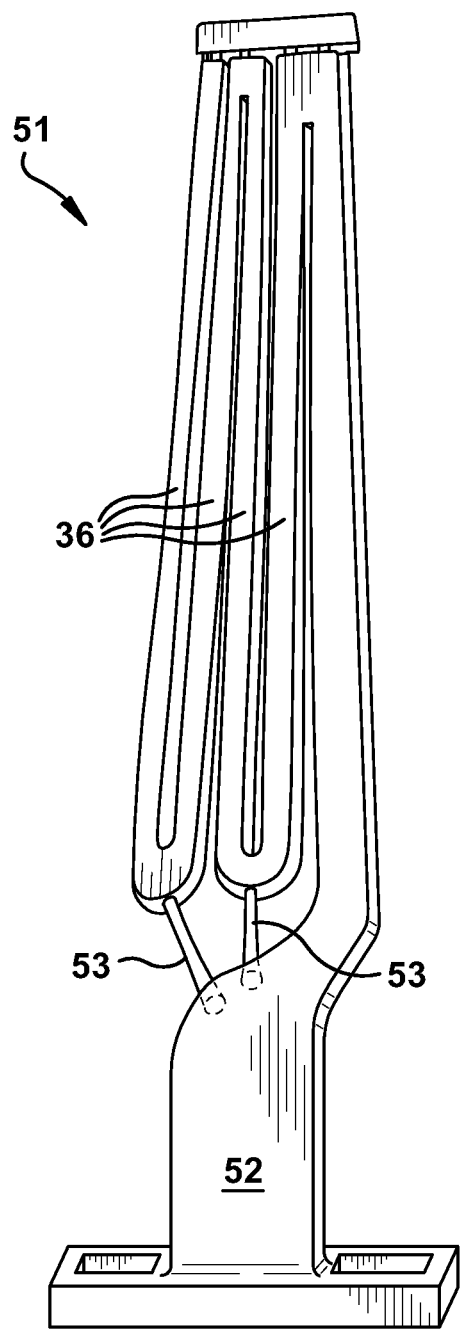
FIG. 6 is a perspective view of a casting core for a turbine rotor blade according to a conventional design.

FIGS. 5 and 6 provide views of interior cooling passages having a configuration of conventional design, which illustrate exemplary internal arrangements in which, as discussed below in relation to FIGS. 7 through 12, the present invention may be used. In general, the interior cooling channels of FIG. 5 include one or more supply passages that connect to a plurality of flow passages 36 formed within the airfoil 25. The supply passage 52 may connect to a coolant source through the root 21 of the rotor blade 16, and supply the flow passages 36 with pressurized coolant. As illustrated, some of the flow passages 36 may include a number of axially-stacked serpentine passages. This design type may include flow passages 36 that extend outboard to a 180 degree turn positioned near the outboard tip 31 of the airfoil 25 and flow passages 36 that extend inboard to another 180 degree turn positioned near the platform 24 of the rotor blade 16.

As also shown in FIG. 5, the airfoil 25 may include other flow passages 36 that are not part of the serpentine circuit. For example, a leading edge flow passage 38 extends parallel and in proximity to the leading edge 28 of the airfoil 25, and is flanked by a flow passage 36 that extends side-by-side to it. Extending side-by-side in this manner, these flow passages 36 may be connected by many crossover passages 43. It will be appreciated that the crossover passages 43 are narrow lateral impingement passages that extend between and connect these flow passages 36. FIG. 5 also includes a trailing edge flow passage 39 that extends parallel to the trailing edge 29 of the airfoil 25. It will be appreciated that such crossover passages 43 are typically provided to enhance the cooling effectiveness of coolant within targeted areas of the airfoil 25, and must be formed to have a particularly narrow cross-sectional flow areas to impingement the flow of coolant into the leading edge flow passage 36. Given the necessarily delicate nature of the core used to form such passages, core yields are typically low and manufacturing costs remain high.

One way in which cores may be strengthened in shown in FIG. 6. FIG. 6 provides a perspective view of a casting core 51 according to another conventional design. As shown, the casting core 51 includes supporting connectors 53 that bolster the structure of the core 51 by connecting the portion of the core 51 that forms the supply passage 52 to one of the inboard passes of the serpentine circuit. It will be appreciated that the supporting connectors 53 will form a connector passage 54 in the case airfoil 25. However, the supporting connectors 53 are generally constrained in size and geometry given the desire to limit the level of coolant flow through the formed connector passage 54 during operation.

Figure 7:
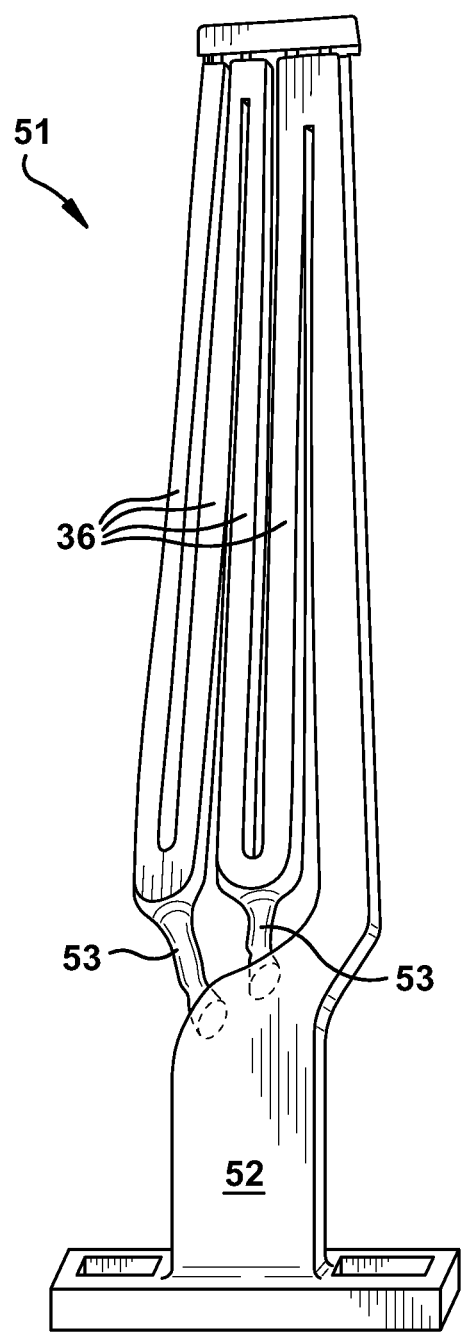
FIG. 7 is a perspective view of a casting core for a turbine rotor blade in accordance with an embodiment of the present invention.

FIGS. 7 through 13 illustrate exemplary embodiments of the present invention. It will be appreciated that those figures and the related discussion are provided as examples and are not intended to narrow the current invention beyond the scope of the appended claims. FIG. 7 illustrates modifications to the internal cooling arrangement of FIG. 6, which includes significantly enlarging the supporting connectors 53. These oversized supporting connectors 53 provide for greater structural robustness in the core. More specifically, the oversized supporting connectors 53 of FIG. 6 have been increased in size so to stabilize movement between the stronger inboard portions of the casting core 51 and the radially extending serpentine passages. It will be appreciated that such modification to the core should beneficially impact core yields in the manufacturing process. As discussed below, according to the present invention, the excess coolant flow that might occur through the connector passage 54 that results from such oversized supporting connectors 53 may be metered per the specialized plug 61, which is discussed in relation to FIGS. 8 through 12.

Figure 8:
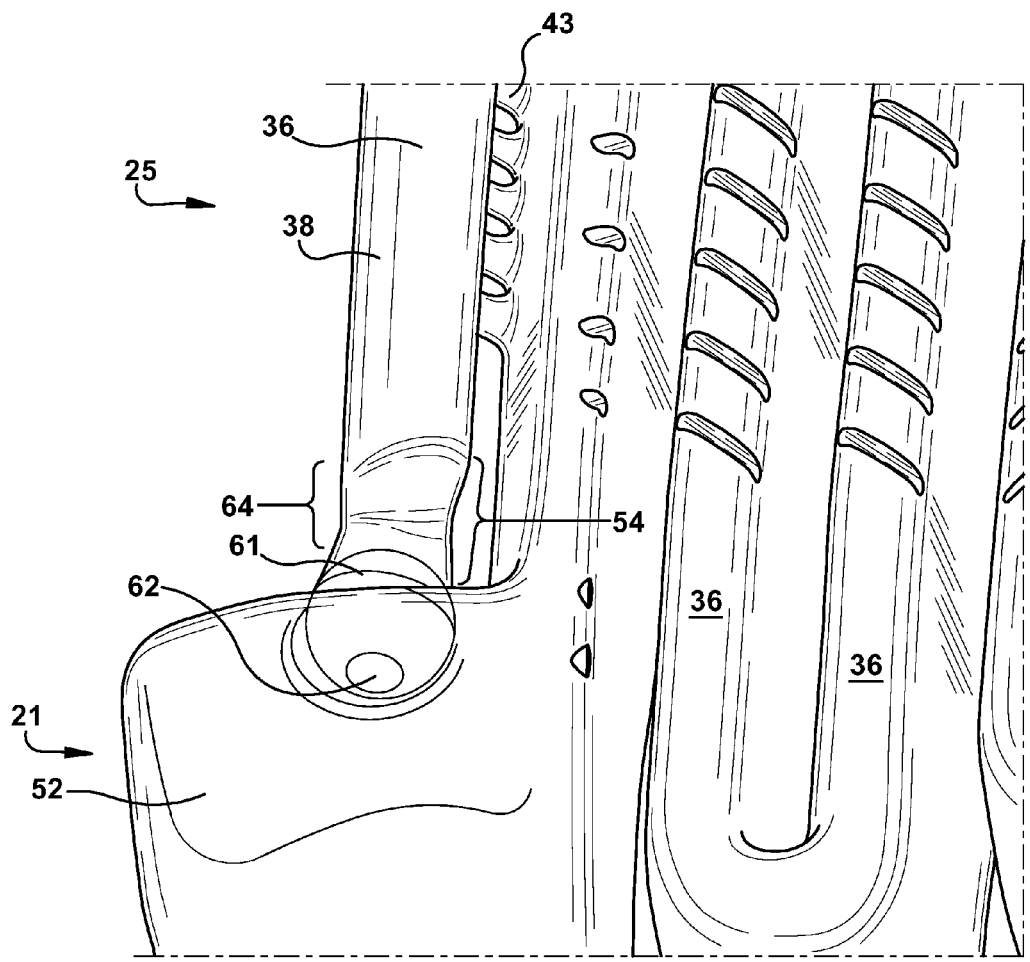
FIG. 8 is a perspective view of an internal cooling configuration for a turbine rotor blade in accordance with an alternative embodiment of the present invention.
Figure 9:
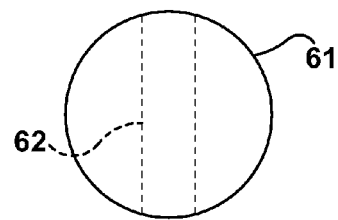
FIG. 9 is a side view of the plug illustrated in FIG. 8.
Figure 10:
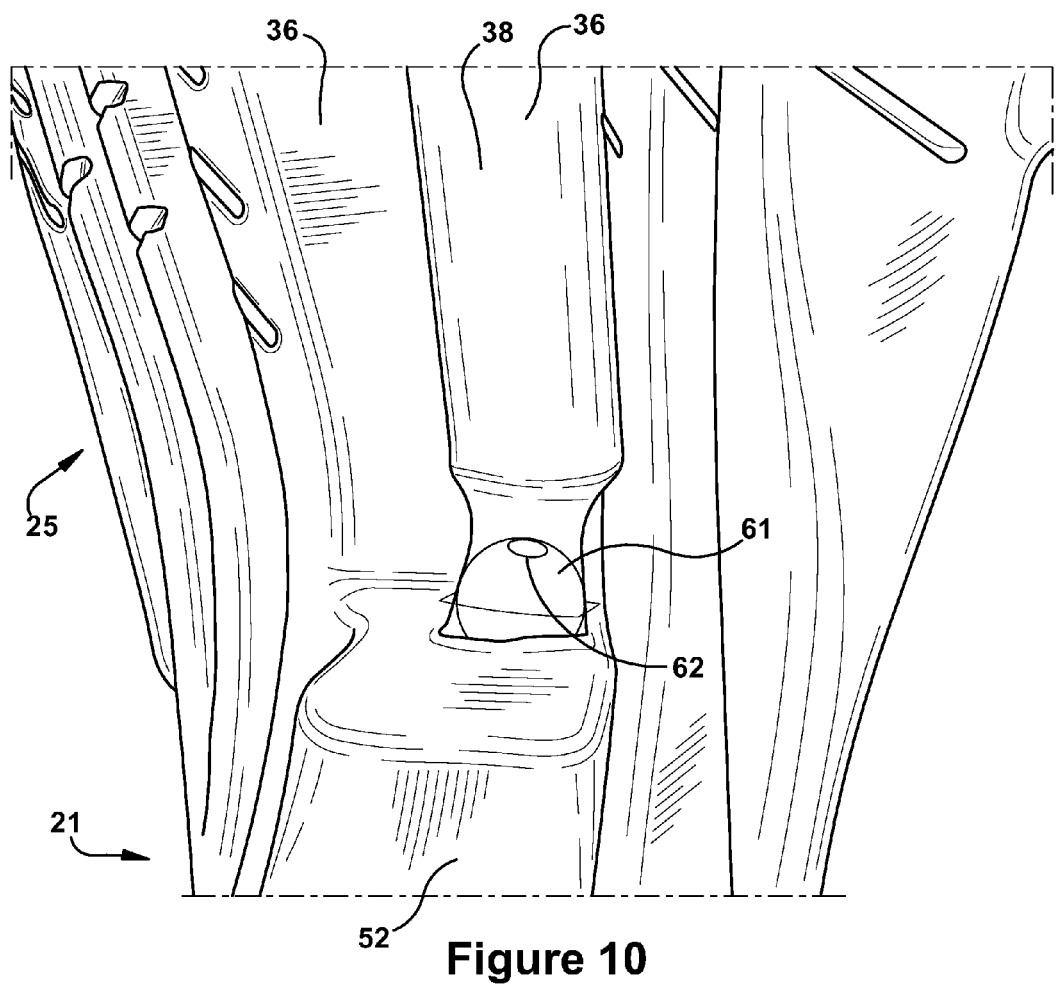
FIG. 10 is a perspective view of the internal cooling configuration of FIG. 8.

FIG. 8 is a perspective view of an internal cooling configuration in accordance with an embodiment of the present invention. It will be appreciated that FIG. 8 shows an internal cooling arrangement similar to the one shown in FIG. 5, in that a supply passage 52 is shown narrowing to a flow passage 36, which then extends side-by-side to a leading edge flow passage 38, and then is connected to the leading edge flow passage 38 via many impingement crossover passages 43 for enhanced cooling. It will be appreciated that the conventional arrangement of FIG. 5 does not include the connecting passage 54 that connects the leading edge flow passage 38 to the supply passage 52, which, according to present embodiments, is formed via an oversized supporting connector 53. The oversized supporting connector 53 may be a thicker version of the supporting connector 53 discussed above in relation to FIG. 7. The connecting passage 54 extends between the supply passage 52 and an inboard end of the leading edge flow passage 38. Configured in this manner, it will be appreciated that the corresponding oversized supporting connector 53 would have provide significant added robustness to this portion of the casing core, and would have be well-suited for limiting relative movement between the components of the core that formed the leading edge connector 38 and the flow passage 36 adjacent to it. Since the core structure that corresponds to the crossover passages 43 is traditionally one of the most troublesome in regard to cause failures during the casting process, adding greater structural robustness between these two passages in the casting core should be well suited to address an area of need. As shown, the present invention may include a specialized plug 61 that includes a plug channel 62 for reducing the cross-sectional flow area associated what likely is an overlarge connecting passage 54 given its formation by the oversized supporting connector 53. As discussed more below, the plug 61 is connected to the interior of the rotor blade 16 and resides in a fixed, blocking position relative to the connector passage 54 and, thereby, limits or meters the coolant flow through this pathway. FIG. 9 provides a side view of the plug 61 in FIG. 8, which may be spherical in shape, and FIG. 10 provides a different perspective of the arrangement of FIG. 8.

Figure 11:
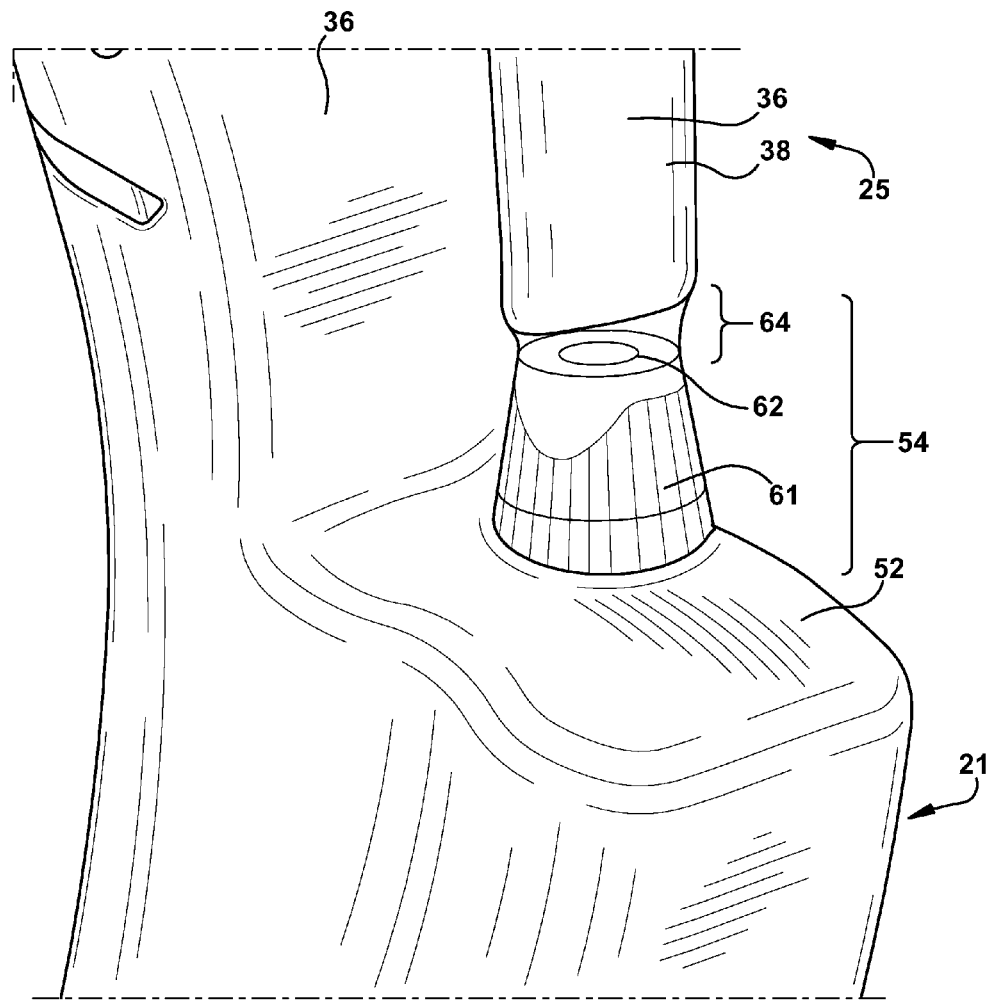
FIG. 11 is a perspective view of internal cooling configuration for a turbine rotor blade in accordance with an alternative embodiment of the present invention.
Figure 12:
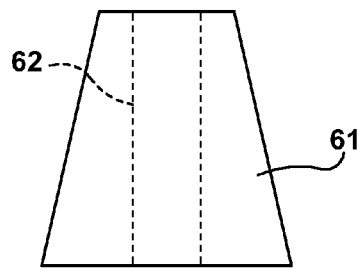
FIG. 12 is a side view of the plug illustrated in FIG. 10.

FIGS. 11 and 12 illustrate an alternative embodiment of the present invention. In this case, the plug 62 has a tapering shape that, upon engagement, may insert into the connecting passage 54 more fully than the spherical plug 62 illustrated discussed above. It will be appreciated that beyond the benefits associated with a more robust casting core, the present invention provides a post-cast tunability that was previously unavailable.

As shown, embodiments of the present invention may include rotor blades and/or stator blades having an internal cooling configuration as provided herein (as well as casting cores that may be used to form them). Accordingly, in certain embodiments, the present invention includes a flow passage that is configured to have flow through it metered by a non-integral plug 61. This non-integral plug 61 may include a plug channel 62 that is configured to correspond to a desired level of coolant flow through the cooling passage. The plug 61 may be connected to the rotor blade in a fixed blocking position relative to the flow passage. The plug channel 62 and the blocking position of the plug 61 may be configured so to allow coolant flow through the plug channel 62 while blocking any other coolant flow through the flow passage during operation.

In certain embodiments, at an upstream end, the flow passage may provide an outlet for coolant flowing from a chamber or supply passage of the internal cooling circuit. The internal cooling circuit may also include another flow passage that also provides an outlet for that particular chamber or supply passage. It will be appreciated that the plug 61 and the plug channel 62 may be configured so to meter coolant flow from the chamber between these two flow passages. In certain embodiments, the second flow passage also may include a non-integral plug 61 that is configured with a plug channel 62. In such cases, the two plugs 61 may have plug channels 62 configured to meter the level of coolant flow between the two flow passages to desired levels. As shown in relation to FIGS. 8, 10, and 11, the chamber of this example may include a forward supply passage and the two flow passages that branch from it may include a flow passage 36 that is part of a serpentine circuit and a connector passage 54 that connects the supply passage to the leading edge.

The present invention may further include methods of manufacturing internal cooling configurations such as those described above. It will be appreciated that these embodiments provide an enhanced level of post-cast tunability to internal cooling configurations of turbine blades 16. In certain embodiments, the method includes the steps of: casting the internal cooling circuit in a rotor blade 16 using a core 51 that includes an oversized supporting connection 53, which is configured for enhanced core robustness. As described, the oversized supporting connection 53 forms a connector passage 54 in the internal cooling circuit, with the "oversized" being relative to a desired level of coolant flow through the connector passage 54 during operation. The corridor the present invention, a plug 61 may be created so to have a plug channel 62. The plug channel 62 may be configured to correspond to the desired level of coolant flow through the connector passage 54.

Another step of the present method includes connecting the plug 61 to the rotor blade 16 so that the plug 61 is fixed in a blocking position relative to the connector passage 54. The step of connecting the plug 61 to the blade may include any conventional process or method, such as brazing or welding. The blocking position may align the plug 61 so coolant flow through the plug channel 62 is allowed while any other coolant flow through the connector passage 54 is prevented.

The plug 61 and the connector passage 54, as illustrated, may be configured so to include a mechanical interference fit therebetween that prevents downstream movement of the plug 61 beyond a certain point in the connector passage 54. The mechanical interference fit may include a seat configured to engage the plug 61 and a narrowed neck section or neck 64 in the connector passage 54, which prevents downstream movement of the plug 61. As illustrated, the blocking position may include the plug 61 residing in an upstream portion of the connector passage 54.

It will be appreciated that the plug 61 may have anyone of several possible configurations. FIGS. 9 and 12 provides preferred embodiments as to the configuration of the plug 61. As shown in FIG. 9, the plug 61 may have a rounded or spherical shape. As shown in FIG. 12, the plug 61 may have a tapering shape which, at a smaller end, is configured to engage the seat of the mechanical interference fit and, at a larger end of the tapering shape, is configured to engage the neck 54 to restrain movement. The plug channel 62 may be formed before the plug 61 is affixed to the rotor blade, or the plug channel 62 may be machined through the plug 61 once it is connected to the rotor blade 16. With line of sight to the plug 61, which would be available per may typical cooling passage configurations, a specifically designed hole or passage may be drilled through the plug 61 via EDM or other conventional machining process to create the metering channel through the plug 61.

As stated, the plug channel 62 may be sized pursuant to a desired level of coolant flow. This desired level may be an anticipated minimum level of coolant flow to satisfy rotor blade cooling requirements. It will be understood that the present invention enables efficient modification to the plug 61 and the plug channel 62 if it is later determined that the actual level of coolant flow through the connector passage 54 is insufficient. For example, if it is determined that the actual level of coolant flow is insufficient, the plug channel 62 may be widened so that a greater amount of coolant flows therethrough during turbine engine operation. This modification may be done by disconnecting the plug 61 from the rotor blade and machining a wider plug channel 62. Such modification also may be completed by disconnecting the plug 61 from the rotor blade and replacing it with a different, modified or new plug 61 that includes a wider plug channel 62, which has a geometry thought to provide a desired level of coolant flow therethrough. Finally, this modification may be completed by machining the plug 61 while it remains attached to the rotor blade 16.

On the other hand, it may be determined that the actual level of coolant flow through the plug channel 62 is too great and should be reduced. Again, this type of modification may be completed in several ways. For example, the plug 61 may be replaced with a modified plug 61 having a plug channel 62 of a reduced size. Or, the plug 61 itself may be modified so to reduce the size of its plug channel 62. This may be done by removing the plug 61 from the rotor blade 16, or it may be done with the plug 61 remaining attached to the rotor blade. Such modifications may be completed using any conventional processes and materials, and the plug 61 may be constructed using any material suitable to the extreme environment of the combustion turbine engine. It will be appreciated that the specific dimensions of the plug channel 62 may depend on the specific application and may be tailored to specific flow amounts in different areas of the internal cooling configuration.

In this manner, the present invention allows the geometry of the core to be sufficiently robust to better withstand the casting process, while providing opportunities for convenient post-cast modification. For example, the present invention may be used to allow larger, oversized connecting structures in the casting cores, thereby strengthening the core so that more successfully survive both the core manufacturing and blade casting processes. The plug 61 of present invention then may be used so to narrow the flow passages formed by these oversized connecting structure so that flow therethrough is limited commiserate with an acceptable level. The present invention may be employed, for example, when the amount of coolant desired through a particular flow passage is sufficiently small so that casting the flow passage as an "as cast" feature would necessarily result in a core with overly delicate features. The present invention also may enable certain other metering methods and more intricate cooling passage design by restraining relative movement between core regions.

For example, in leading edge flow passages 38, metered flow to this cavity is traditionally accomplished using a large number of very small cross-over passages that provide impingement cooling. As will be appreciated, the cross-over passages are areas of high stress due to their small size, geometry, and large thermal gradients. The present invention may allow the removal of some of the cross-over passages with an inboard connector passage, which would strengthen this highly stressed region of the rotor blade. More specifically, the present invention may allow for the removal of the bottom-most crossover impingement passages along the leading edge of the airfoil, where the mechanical and thermal stresses on the blade are most extreme. This will improve component life and reduce the life-cycle cost of the turbine engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of manufacturing a blade having an internal cooling circuit, the blade configured for use in a combustion turbine engine, wherein the turbine blade comprises an airfoil portion and a root portion, the method comprising the steps of:
    casting the internal cooling circuit using a core that includes an oversized supporting connection configured for enhanced core robustness, wherein the oversized supporting connection forms a first flow passage in the internal cooling circuit and is oversized relative to a desired level of coolant flow through the first flow passage during operation;
    forming a plug;
    forming a plug channel through the interior of the plug, the plug channel configured to correspond to the desired level of coolant flow through the first flow passage; and
    connecting the plug to the blade so that the plug is fixed in a blocking position relative to the first flow passage.

2. The method of manufacturing a blade according to claim 1, wherein the blade comprises a rotor blade in a turbine section of the combustion turbine engine.

3. The method of manufacturing a blade according to claim 2, wherein the step of connecting the plug to the blade includes brazing the plug in the blocking position.

4. The method of manufacturing a blade according to claim 2, wherein the blocking position comprises aligning the plug so coolant flow through the plug channel is allowed while any other coolant flow through the first flow passage is prevented.

5. The method of manufacturing a blade according to claim 2, wherein the plug and first flow passage are configured so to include a mechanical interference fit therebetween preventing downstream movement of the plug beyond a predetermined point.

6. The method of manufacturing a blade according to claim 5, wherein the mechanical interference fit includes a seat configured to engage the plug and the predetermined point comprises a narrowed neck section in the first flow passage; and
    wherein the blocking position includes the plug residing in an upstream portion of the first flow passage.

7. The method of manufacturing a blade according to claim 6, wherein the plug comprises a tapering shape, wherein a smaller end of the tapering shape is configured to engage the seat of the mechanical interference fit and a larger end of the tapering shape is configured to engage the neck section.

8. The method of manufacturing a blade according to claim 6, wherein the plug is spherical in shape.

9. The method of manufacturing a blade according to claim 5, wherein the forming the plug channel is completed via a machining process after the plug is connected to the blade in the blocking position.

10. The method of manufacturing a blade according to claim 5, wherein the forming the plug channel is completed before the plug is connected to the blade in the blocking position.

11. The method of manufacturing a blade according to claim 2, wherein the desired level of coolant flow comprises a minimum level of coolant flow based on blade cooling criteria;
    further comprising the steps of:
        determining that an actual level of coolant flow through the first flow passage is insufficient; and
        widening the plug channel in the first flow passage.

12. The method of manufacturing a blade according to claim 11, further comprising the steps of:
    disconnecting the plug from the blade;
    reconnecting the modified plug in the blocking position.

13. The method of manufacturing a blade according to claim 2, wherein the desired level of coolant flow comprises a minimum level of coolant flow based on blade cooling criteria;
    further comprising the steps of:
        determining that an actual level of coolant flow through the first flow passage is too large; and
        narrowing the plug channel in the first flow passage.

14. The method of manufacturing a blade according to claim 13, further comprising the steps of:
    disconnecting the plug from the blade;
    forming a new plug having a reduced plug channel;
    reconnecting the new plug in the blocking position.

15. The method of manufacturing a blade according to claim 2, wherein the plug comprises a first plug;
    further comprising the step of replacing the first plug with a second plug, the second plug comprises a modified plug channel compared to the plug channel of the first plug.

16. The method of manufacturing a blade according to claim 2, wherein the plug comprises a first plug;
further comprising the steps of
  forming a second plug;
  forming a plug channel through the second plug, the plug channel configured to correspond to a new desired level of coolant flow through the first flow passage;
  disconnecting the first plug from the blade; and
  connecting the second plug to the blade so the second plug comprises the fixed blocking position relative to the first flow passage.

* * * * *